United States Patent [19]
Shelton

[11] 3,821,764

[45] June 28, 1974

[54] ILLUMINATING APPARATUS

[75] Inventor: William A. Shelton, Cambridge, Mass.

[73] Assignee: Polaroid Corporation, Cambridge, Mass.

[22] Filed: Jan. 2, 1973

[21] Appl. No.: 320,449

[52] U.S. Cl. .................. 354/126, 240/1.3, 354/132
[51] Int. Cl. .......................................... G03b 15/03
[58] Field of Search .......... 95/11 L, 11 R, 11.5, 1.1; 240/1.3, 2 C, 20; 355/67, 70

[56] References Cited
UNITED STATES PATENTS

| | | | |
|---|---|---|---|
| 1,277,110 | 8/1918 | Patterson | 240/1.4 |
| 2,590,916 | 4/1952 | Back | 355/67 X |
| 2,596,376 | 5/1952 | De Goeij | 355/70 X |
| 2,629,813 | 2/1953 | Murphy | 355/70 X |
| 3,146,661 | 9/1964 | Young | 355/57 |
| 3,263,584 | 8/1966 | Knus | 95/11 L |
| 3,312,143 | 4/1967 | Karow et al. | 350/314 X |
| 3,456,101 | 7/1969 | Rentschler et al. | 240/1.3 |
| 3,610,913 | 10/1971 | Bowen | 240/1.3 |

FOREIGN PATENTS OR APPLICATIONS 900,246  6/1945  France ............................ 240/2 C

*Primary Examiner*—Richard M. Sheer
*Assistant Examiner*—Kenneth C. Hutchison
*Attorney, Agent, or Firm*—William A. Danchuk

[57] ABSTRACT

A lighting system for producing aesthetically natural and pleasing facial lighting for portrait photographs while eliminating objectionable background shadow. In its most basic form, the system utilizes a single source of artificial light and a light directing assembly for illuminating a subject in a specific manner to avoid shadows of the subject on a background within the field of view of an objective lens of a photographic camera.

29 Claims, 16 Drawing Figures

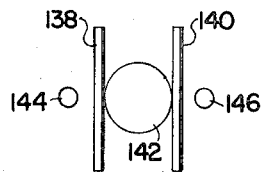
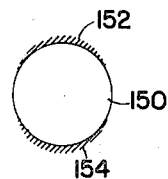
FIG. 11a  FIG. 11b
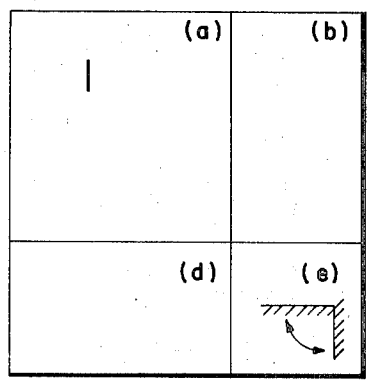
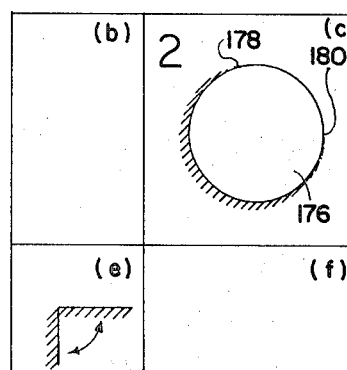
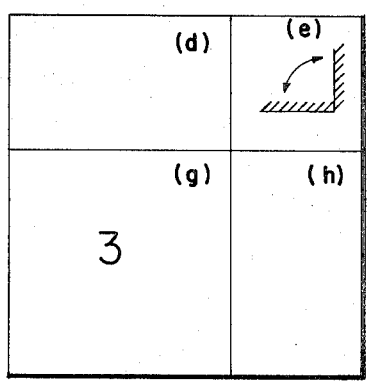
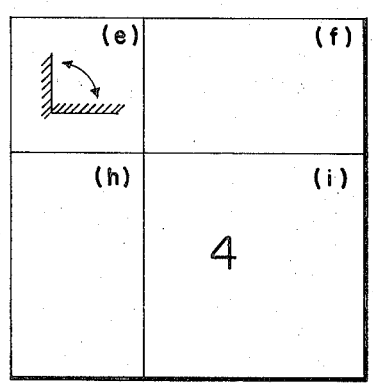
FIG. 14

ILLUMINATING APPARATUS

BACKGROUND OF THE INVENTION

In a large portion of portrait photography employing artificial lighting sources, it is desirable to have at least some portion of the light emanate from a position proximate the optical axis of the camera. The primary reason for doing this is to alleviate harsh and opaque shadows on the subject's face which usually detract from the aesthetics of the photograph.

An inevitable consequence of this type of lighting is the production of aesthetically undesirable subject shadows on the background. This result is accentuated when the background is lightly colored and is situated relatively close to the subject as may be found in identification and commercial volume portraiture work.

Photographic portraits in which these undesirable background shadows are alleviated may be taken through the employment of complicated, cumbersome and costly equipment which is generally only within the budgetary scope of the serious amateur and professional portrait photographer. These types of equipment generally include separate and distinct light sources which illuminate the subject and background but which are divorced from the camera and require exacting positioning and movement. Moreover, the knowledge required in setting up and positioning the various lighting equipment components is usually learned from long experience in the field of portraiture.

While various systems exist which endeavor to overcome the problem of background shadow, they either fail to accomplish complete elimination of background shadow or produce flat and unnatural results in their attempt to do so. For instance, ring light systems produce prenumbral shadows of the subject on a background, double light systems produce shadows on each side of the of the subject, and diffuse umbrella systems result in an overall pasty and unnatural lighting on the subject and have large diffuse areas of reflection when the subject wears glasses. Additionally, front projection systems employing half-silvered mirrors retain a certain amount of unnatural modeling and require photographing a subject through a half-silvered mirror.

SUMMARY OF THE INVENTION

The present invention provides a portable and inexpensive lighting system for producing aesthetically natural and pleasing facial lighting for portrait photographs while eliminating objectionable background shadow. The system, in its most basic form, utilizes a single source of artificial light to illuminate a subject in a specific manner to avoid background shadows. In order to accurately direct the light emanating from the source, an optical light redirecting system is strategically placed in front of the source of light. When properly arranged, the lighting system properly illuminates the subject with neither a "flat" nor a "pasty" lighting effect. Moreover, the lighting system is so light-weight as to be portable and can be effectively utilized by even the most inexprienced amateur photographer for use as either a primary or a fill-in lighting system. The lighting system may be employed in portrait identification photography, studio photography, candid portraits and, even in motion pictures and television in which portrait-like situations arise. Moreover, the present lighting system may employ various types of light sources for illuminating the subject, whether they be flash or continuous in nature.

One feature and object of the present invention is to provide a portable lighting system for use in portrait photography which produces an aesthetically pleasing photograph of a subject without objectionable background shadow.

Another feature and object of the present invention is to provide a camera mounted lighting system for use in portrait photography which is easily operated with a minimum of manual settings.

A further feature and object of the present invention is to provide a portable, inexpensive and easily operable lighting system for use in the production of identification card photographs which are not detracted from by objectionable background shadow.

Another feature and object of the present invention is to provide a lighting system for use with non-portraiture subjects for eliminating bothersome background shadow.

Still another feature and object of the present invention is to provide an illuminating apparatus for use with a photographic camera, the illuminating apparatus comprising: a source of artificial illumination to be mounted on the camera for illuminating a subject to be photographed; an optical light redirecting system, positioned in close proximity with the lighting source, for directing light from said lighting means toward the subject to be photographed; and means associated with the lighting source for providing at least two separate light beams toward the subject, the means associated with the light source being configured so as to further selectively direct the two light beams into distinct fields of influence on the subject's face, the two light beams having an overlap substantially equal in width or less than the width of the subject's face at the subject distance.

Other objects of the invention will in part be obvious and will in part appear hereinafter.

The invention accordingly comprises the apparatus possessing features, techniques, and properties which are exemplified in the description to follow hereinafter.

For a fuller understanding of the nature and objects of the invention, reference should be made to the following detailed description taken in connection with the accompanying drawings.

BRIEF DESCRIPTION OF THE DRAWINGS

FIG. 11a is a front elevation of an apparatus which might be used in an attempt to produce a photograph without background shadow;

FIG. 11b is a front elevation of a subject associated with the apparatus of FIG. 11a;

FIG. 14 is a more detailed representation of the subject and background of FIG. 13.

DETAILED DESCRIPTION OF THE INVENTION

The lighting system of the present invention is ideally suited for both professional and amateur portrait photography as well as identification card photography. The lighting system features a unique arrangement serving to enhance the quality of subject lighting by alleviating objectionable "behind the head" shadow. In a preferred embodiment of the present invention, the lighting system requires no manual settings and is capable of producing portraits of aesthetically pleasing quality.

Figure 1:
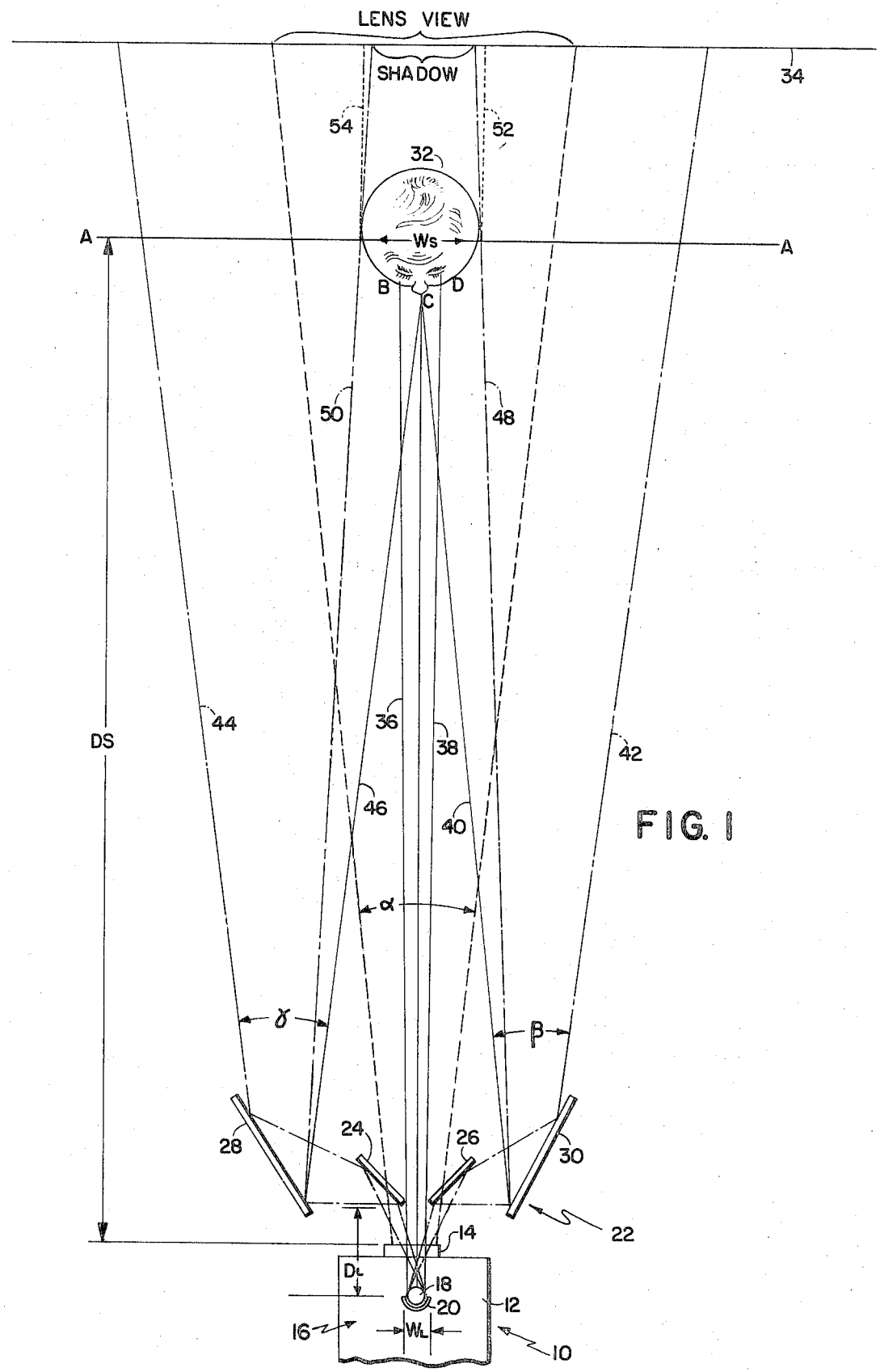
FIG. 1 is a diagrammatic representation of the lighting system of the present invention in combination with a photographic camera suited for portrait photography.
Figure 4:
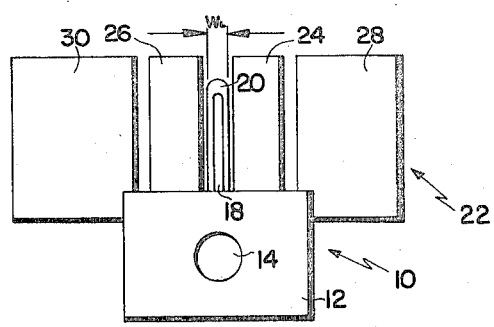
FIG. 4 is a front elevation of the camera and lighting system of FIG. 1.

Looking to FIGS. 1 and 4, there is shown a preferred embodiment of the lighting system according to the present invention in which there is shown a camera illustrated generally at 10. Camera 10 incorporates a housing 12 and an objective lens 14. Objective lens 14 has a relatively long focal lens for overcoming perspective distortion. Cameras incorporating lenses having relatively long focal lens are ideally suited for portrait photography as is well known in the art. Additionally, objective lens 14 is constructed having a view of relatively narrow angular extent. This angle is represented in FIG. 1 as $\alpha$. Although not positively disclosed, camera 10 incorporates sufficient components for producing a photographic exposure.

Positioned on the top of housing 12 is a light source shown generally at 16. Light source 16 is composed of an electronic flash tube 18 and a reflector 20. Electronic flash tube 18 is connected to appropriate circuitry (not shown) which insures its ignition upon camera 10's actuation. For reasons which will become apparent below, electronic flash tube 18 and reflector 20 are formed having a relatively thin width. Located in front of camera 10 and above objective lens 14 is a light redirecting assembly shown generally at 22. Assembly 22 includes a pair of outwardly facing mirrors 24 and 26 and a second pair of forwardly directed mirrors 28 and 30. Mirrors 24, 26, and 28 and 30 are retained in their operative status (as shown in FIG. 1) by brackets or the like (not shown). Mirrors 24 and 26 are separated from each other a distance approximately equal to the width of reflector 20. Additionally, mirror 28 and 30 are "toed in" a sufficient amount for achieving the specific redirection of light emanating from electronic flash tube 18. A subject 32 is placed a distance $D_S$ from objective lens 14. Subject 32 has a head width $W_S$ which is standardized for most subjects. Placed behind subject 32 is a background shown generally at 34.

As mentioned previously, electronic flash tube 18 and reflector 20 have a relatively small width denoted by $W_L$. Mirrors 24 and 26, located forwardly from flash tube 18, extend outwardly forwardly therefrom a distance $D_L$ which is measured from the nearest point X on mirrors 24 and 26. Configured as such, the elements of the lighting system will be seen to cooperate so as to produce shadow only behind the subject 32 in a position in which it cannot be seen by objective lens 14.

The lighting assembly 22 splits the light emanating from flash tube 18 into three distinct parts. Specifically, there exists a central part, a leftward part, and a rightward part. The central part of the three parts into which the light from reflector is split is defined by light rays contained within lines 36 and 38. Lines 36 and 38 represent the limiting light rays in the central light bundle emanating from flash tube 18 and reflector 20 through a gap located between mirror 24 and mirror 26 and may be more easily seen in FIG. 2. The central light bundle will be described in further detail as the specification progresses. The right portion of the three-part light bundle is contained within a subtended angle $\beta$. Angle $\beta$ is defined by two limiting light rays 40 and 42. Light ray 40 defines the leftmost light ray of the light bundle contained within angle $\beta$ while light ray 42 defines the rightmost ray contained within angle $\beta$. Similarly, the left portion of the three-part light bundle emanating from reflector 20 is defined within a light bundle subtending an angle $\gamma$. Angle $\gamma$ has a leftward limiting light ray 44 and a right limiting light ray 46. Light ray 40 emanates from reflector 20 and is reflected by outwardly facing mirror 26 toward an inner portion of forwardly facing mirror 30. Light ray 42 is likewise reflected by outwardly facing mirror 26 toward an outer portion of forwardly facing mirror 30. Due to the geometrical configuration of mirrors 24, 26, 28 and 30, no light ray may pass to the right of light ray 46 from the left portion of the three-part light bundle and no light ray may pass to the left of light ray 40 from the right light bundle. It should also be noted that both light rays 40 and 46 terminate at the point C on the subject face.

Light bundle $\beta$ includes a light ray 48 which does not fall upon the subject's face but passes just to the right of the right side of the subject's head (as seen by lens 14). Similarly, light bundle $\gamma$ contains a light ray 50 which does not illuminate the subject's face but passes just to the left of the left side of the subject's head (as seen by lens 14). Light rays 48 and 50 define the limit of the shadow produced by the present lighting system. It is obvious that shadow is produced on background 34 where light rays cannot reach. Since no light can pass to the left of light ray 48 or to the right of light 50, a shadow from the subject's head is produced on background 34. It should be noted, however, that this shadow is fully contained behind the subject's head and is not seen by the camera lens. In particular, the field of view of objective lens 14 behind the subject's head is limited to the right by line 52 and to the left by line 54. As may be evidenced from FIG. 1, the shadow produced by the present lighting system is fully contained within lines 52 and 54, and, accordingly, may not be seen by objective lens 14.

Figure 2:
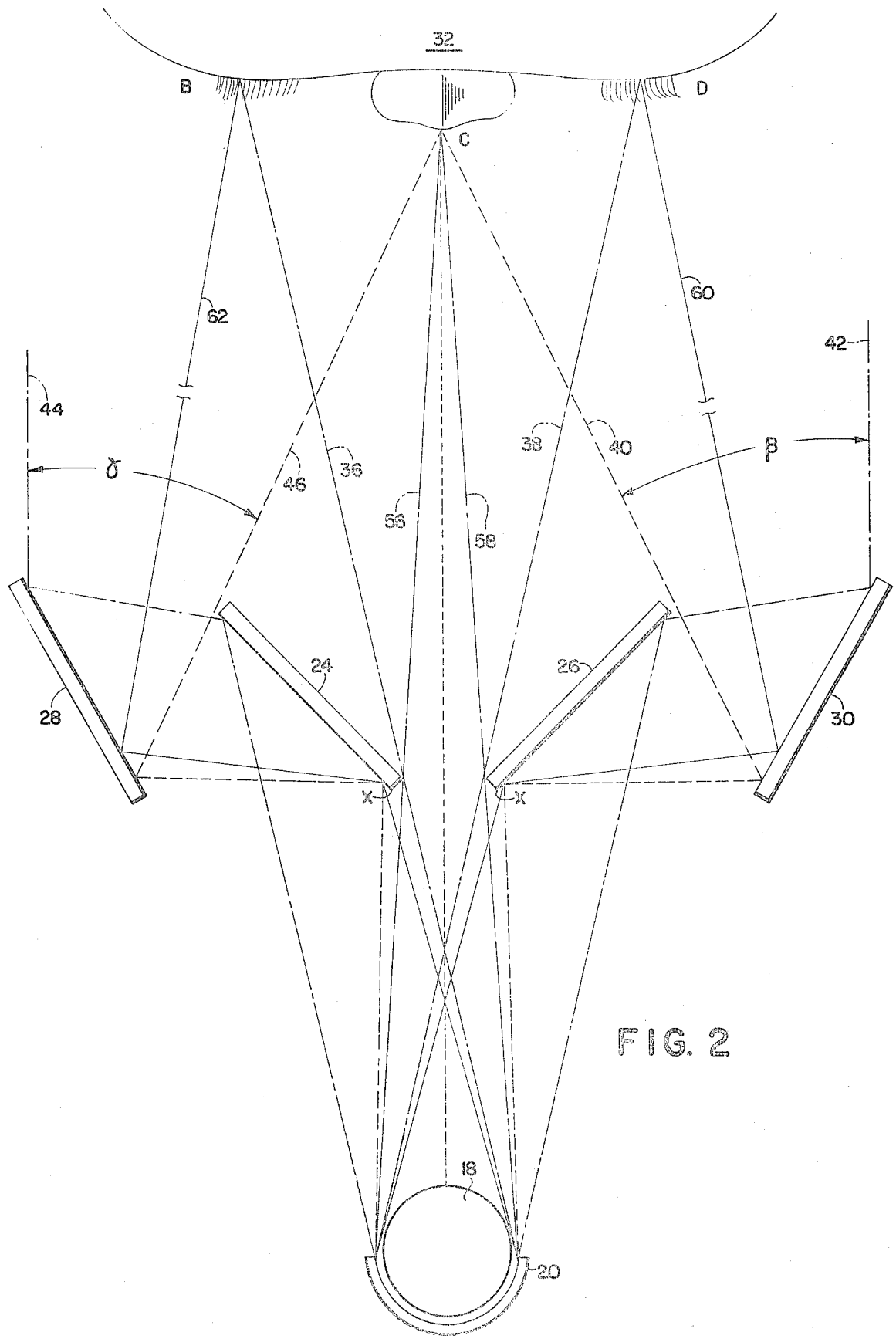
FIG. 2 is a more detailed illustration of some of the more salient portions of FIG. 1.

Looking to FIG. 2, there is shown a more detailed view of the salient light rays produced by the lighting system 22. Of particular importance are the light rays passing through the gap between mirrors 24 and 26. This center light bundle is particularly important for alleviating aesthetically undesirable shadows on the sides of the nose of a subject having a relatively narrow nose. All of the light rays within this middle bundle of light rays are contained within the limiting light rays 36 and 38. Light ray 36 emanates from the right side of reflector 20 and just passes by the inside edge of mirror 24 and terminates at point B of the subject's face. Conversely, light ray 38 emanates from the left side of reflector 20 and just passes by the inside edge of mirror 26 terminating at point D of the subject's face. Two light rays 56 and 58 emanate from the left and right sides of reflector 20 respectively, and terminate at point C near the midpoint of the subject's face. The convergent nature of rays 56 and 58 is also dependent upon the gap formed between mirrors 24 and 26. Additionally, light bundles $\beta$ and $\gamma$ contain light rays 60 and 62, respectively, which terminate at points D and B, respectively, on the subject's face. Points B, C, and D represent transition points of the three separate light bundles emanating from reflector 20 and flash tube 18. It should be also noted that points X on mirrors 24 and 26 limit the light ray cut-offs of rays 36 and 38. Additionally, points X limit the light ray cut-offs that become rays 40 and 46.

Figure 3:
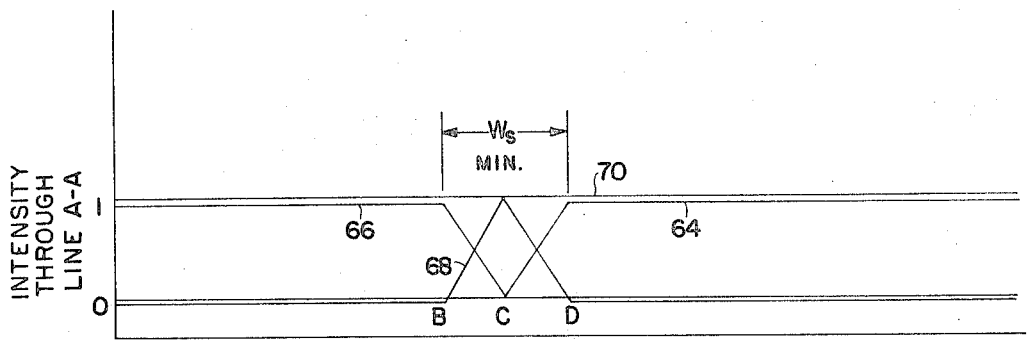
FIG. 3 is a graph of the light intensities of the lighting system of FIG. 1.

The light intensities of the three light bundles taken at line A—A of FIG. 1 is shown in FIG. 3. The intensity of the light bundle contained within the angle $\beta$ is represented by a line 64 having an intensity of zero up to point C and increasing to one from C to D. The intensity of the light bundle contained within the angle $\gamma$ is represented by a line 66 and the center bundle by a line 68 having a peak at C. The total of the intensities of the three light bundles is represented by a line 70. Due to the configuration of the lighting arrangement 22, the total intensity at every point is equal to one, thereby producing an even illumination across the face of subject 32. It should be further noted that the subject width $W_S$ must be equal to or greater than the distance between transition points B and D on lines 64 and 66 denoted in FIG. 3 to eliminate shadows on background. Should the transition points in bundles $\gamma$ and $\beta$ not coincide, there would exist unpleasing areas of lightness and darkness across the subject's face. While only one subject distance $D_S$ has been disclosed, it is intended to represent only one of many subject distances for which the present lighting arrangement may be employed. For such varying distances, there need be only minor adjustments to the angles of the mirrors to produce the same lighting result. Additionally, while only one mirror and light arrangement has been disclosed, it should become apparent that there are lighting arrangements which are equivalent, e.g., a light source placed at point X on mirrors 24 or 26 with a front reflecting mirror in place of source 18 and reflector 20.

Figure 5:
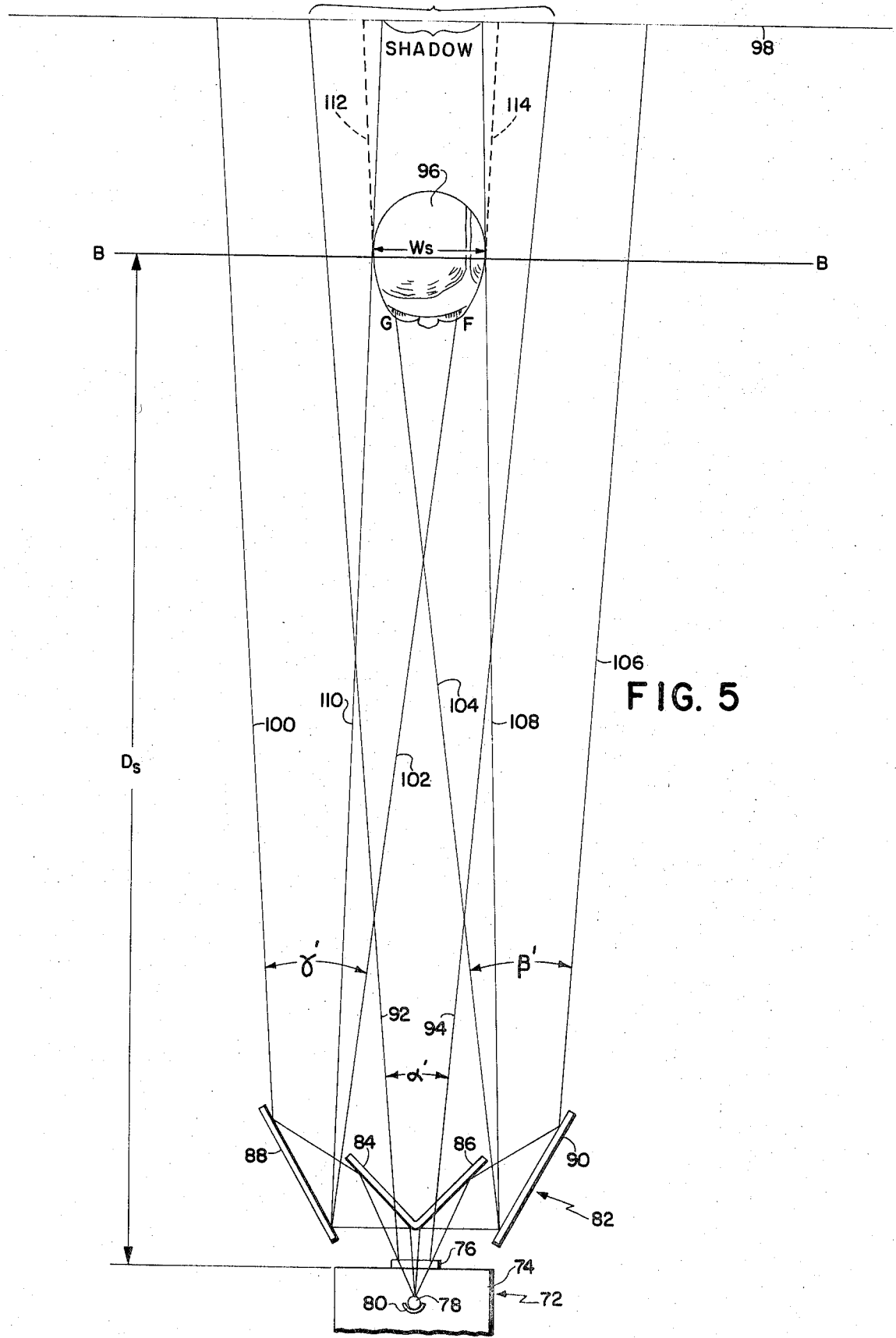
FIG. 5 is a diagrammatic representation of a second embodiment of the present invention.

FIG. 5 discloses a second embodiment of the present lighting arrangement. A camera 72 includes a housing 74 and an objective lens 76. Mounted on the top of camera 72 is an electronic flash tube 78 and a reflector 80. Camera 72, flash tube 78 and reflector are similar to those shown in the first embodiment of the invention. A mirror arrangement, shown generally at 82, is mounted in front of camera 72 by appropriate mounting brackets (not shown). The mirror arrangement 82 includes a pair of outwardly facing mirrors 84 and 86 and a pair of forwardly facing mirrors 88 and 90 positioned outwardly from mirrors 84 and 86. Mirrors 84 and 86 are butted up against each other and provide no gap as disclosed in the first embodiment.

Objective lens 76 has a field of view subtended by an angle $\alpha'$ included within the limiting lines 92 and 94. A subject 96 is placed a distance $D_S$ from objective lens 76. Placed behind subject 96 is a background shown generally at 98. The lighting system 82 splits the light emanating from flash tube 78 and reflector 80 into two distinct parts. In particular, the light emanating from reflector 80 and tube 78 is split into a left portion and a right portion. The left portion is contained within a subtended angle $\gamma'$ defined by two limiting light rays 100 and 102. Light ray 100 defines the leftmost light ray contained within the left light bundle while light ray 102 defines the rightmost light ray. Similarly, the right portion of the light is contained within a light bundle subtending an angle $\beta'$. The light bundle contained within angle $\beta'$ has a leftmost limiting light ray 104 and a rightmost limiting light ray 106. Light ray 104 starts at the right-hand side of reflector 80 and is reflected by outwardly facing mirror 86 toward an inner portion of forwardly facing mirror 90. Light ray 106 is likewise reflected by outwardly facing mirror 86 toward an outer portion of forwardly facing mirror 90. Due to the angular positioning of mirrors 84, 86, 88 and 90, no light ray is allowed to pass to the right of light ray 102 from light bundle $\gamma'$ and no light ray is allowed to pass to the left of light ray 104 of the light bundle contained within angle $\beta'$. It should also be noted that light ray 102 terminates at a point F on the subject's face while light ray 104 terminates at a point G on the subject's face.

Light bundle $\beta'$ includes a light ray 108 which does not fall upon the subject's face but passes just to the right of the subject's head. Similarly, light bundle $\gamma'$ contains a light ray 110 which does not illuminate the subject's face but passes just to the left of the subject's head (as viewed by the camera). As before, light rays 108 and 110 define the outer limits of the shadow produced by lighting system 82. As no light ray can pass to the left of ray 108 or to the right of light ray 110, a shadow of the subject's head is produced on background 98. This shadow, however, is fully contained behind the subject's head and is hidden within the limiting lines 112 and 114 of the field of view of objective lens 76. Accordingly, the shadow may not be seen by objective lens 76.

Figure 7:
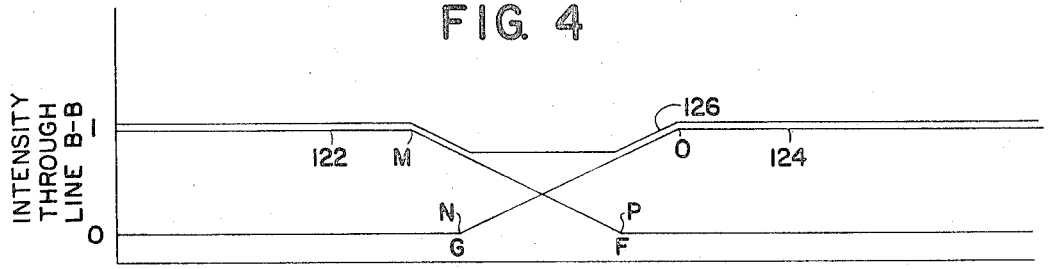
FIG. 7 is a graph of light intensities of the system of FIG. 5 in an undesirable mode of operation.
Figure 8:
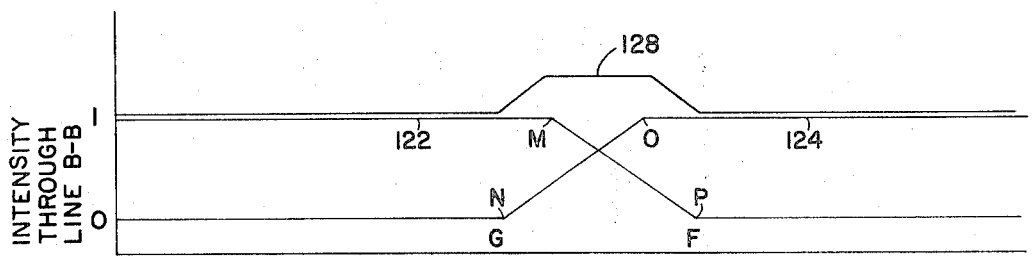
FIG. 8 is another graph of the light intensities of FIG. 7 in another undesirable mode of operation.
Figure 6:
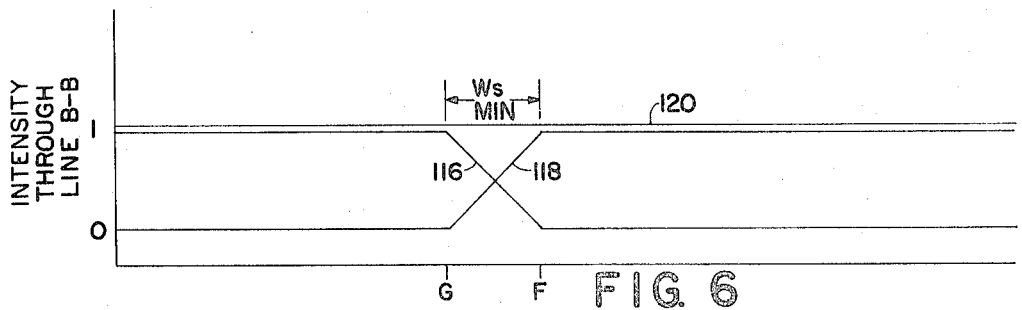
FIG. 6 is a graph of the light intensities of the second embodiment of the present invention as shown in FIG. 5.

Looking to FIG. 6, there is shown a representation of the intensities of light bundles $\gamma'$ and $\beta'$ at the subject distance $D_S$ taken through the line B—B of FIG. 5. Line 116 represents the light intensity from light bundle $\gamma'$ and line 118 represents the light intensity from light bundle $\beta'$. Line 120 is the sum total of the light intensities from both light bundle $\gamma'$ and $\beta'$. When the mirror geometry is properly configured, the sum of the two intensities results in even illumination over the whole of the subject's face. Accordingly, there are no light or dark areas of varying light intensities which detract from the portrait photograph. It is important to note, however, that the relative subject distance and the mirror geometry have a definite relationship with even illumination across the subject's face. For example, FIGS. 7 and 8 represent light intensities through the line B—B for subject distances other than $D_S$. FIG. 7 represents the light intensities taken through line B—B at a subject distance less than $D_S$ while FIG. 8 represents the same at a subject distance greater than $D_S$ as shown in FIG. 5. In both FIGS. 7 and 8, line 122 represents the light intensity of light bundle $\gamma'$ while line 124 represents that of light bundle $\beta'$. Moreover, there exist four points of discontinuity (M, N, O and P) on the curves at which the light intensities begin to change drastically and may be referred to as transition points. When the subject distance is less than $D_S$, using the same mirror configuration shown in FIG. 5, an area of lower light intensity is produced. This area is readily shown in the resultant light intensity denoted by line 126 in FIG. 7. Similarly, if the subject is moved too far from camera 72 an area of higher light intensity is produced. This area of higher light intensity is denoted by line 128 in FIG. 8. In both cases, the resultant sum of the light intensities produces aesthetically undesirable lighting results on the subject's face thereby detracting from the pleasing qualities exemplified in a correctly set lighting system shown in FIGS. 5 and 6. Where it is desired to photograph the subject at a distance other than $D_S$, the outer mirrors 88 and 90 may be angled differently to cause the transition or discontinuity points to coincide for the new subject distance. Accordingly, the subject must be placed at an optimum distance from the camera lens for "shadowless" photographs exhibiting even illumination across the subject's face for any given geometric mirror configuration. While only one such configuration has been shown, it should become apparent that the present lighting system embodiments exemplified in FIGS. 1 and 5 retain the necessary variability for the production of background "shadowless" photographs for most any subject distance. Additionally, a nonmovable embodiment of the present lighting system may be effectively employed in conjunction with a portrait camera having a relatively long focal length lens and a range determining finder. A camera of this variety is disclosed in a U.S. Pat. No. 3,720,145 entitled "Portrait Camera Having Synchronized Flash Illumination Source" by Bruce K. Johnson, et al., and assigned in common herewith.

Figure 9A:
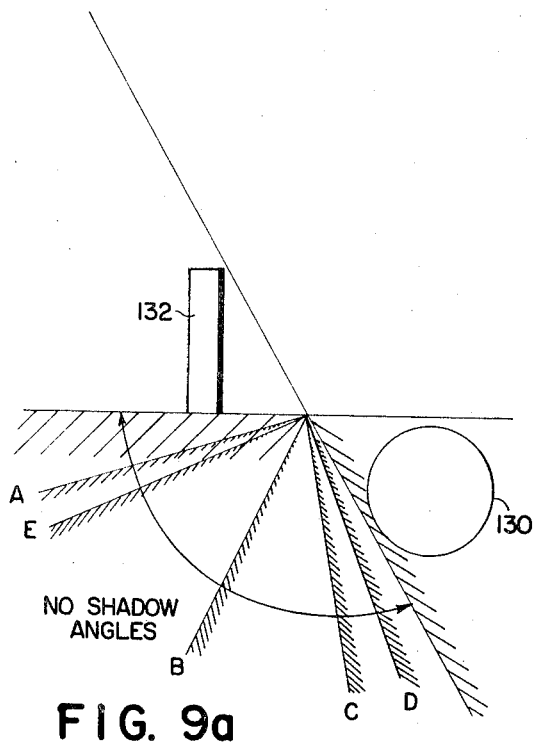
FIG. 9a is a diagrammatic representation of a portion of the lighting system of FIGS. 1 and 5 illustrating the general theory of the present invention.
Figure 9B:
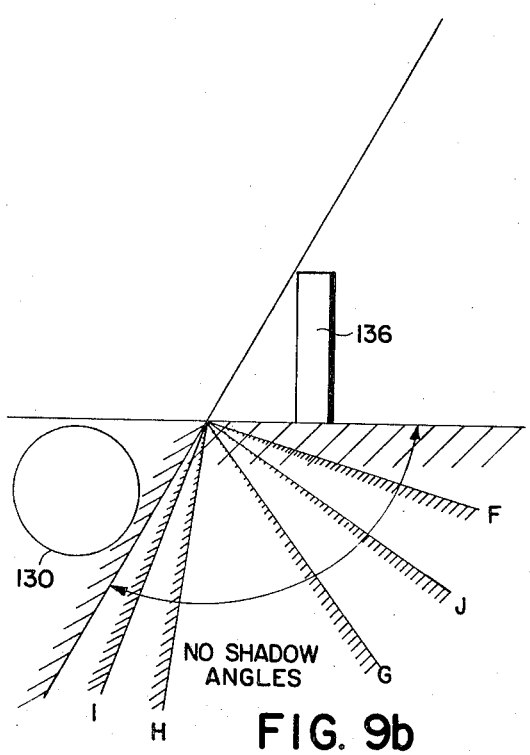
FIG. 9b is another diagrammatic representation of another portion of the lighting system of FIGS. 1 and 5 illustrating the general theory of the present invention.
Figure 10:
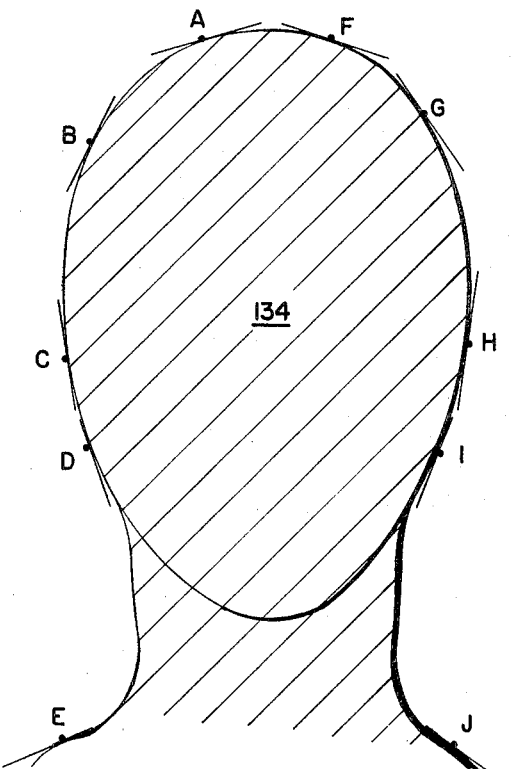
FIG. 10 is a front elevation of a subject to be photographed.

The general theory of "shadowless background" illumination of a subject to be photographed will now be described in conjunction with FIGS. 9 and 10. Looking to FIGS. 9a and 9b, there is shown a representation of both allowable and nonallowable angular subject orientations for "shadowless" illumination and the dependency of both upon the placement of the light bundle of light source with respect to the objective lens of the camera. FIG. 9a represents the shadowed and nonshadowed angular limits produced by a left-hand light bundle while 9b represents similar angular limits for a right-hand light bundle source. It should be noted, however, that FIGS. 9a and 9b represent angular orientation and not physical areas or locations. FIG. 9a shows the relative positioning of a lens 130 and a source of illumination 132 located to the left of lens 130. The orientation shown will produce a shadow visible to the camera lens behind of an object which does not satisfy the angular requirements denoted for the "no shadow" angles. No shadow will be produced by source 132 by the left hand edge of the subject when the angles of the left hand edge conform to the "no shadow" angles. For example, looking to FIG. 10, a point A on a subject's head is within the allowed "no shadow" angles of FIG. 9a and lens 130 will not "see" the shadow produced because it will be hidden behind the subject's head. Similarly, points B, C, D, and E will produce shadow which is hidden behind the subject's head. Note, however, that point F (on the right hand edge) is without the "no shadow" angle and will, therefore, cast a shadow on the top right portion (as seen by lens 130) of the subject's head within the field of view of lens 130. It is this type of shadow which is aesthetically undesirable and must be eliminated. Note, also, that points G, H, I, and J are also without the "no shadow" angles of FIG. 9a due to the body being located on the wrong side of the head's boundary. As a result, the use of source 132 with lens 130 alone would produce shadows on the right side of the subject's head and within the field of view of lens 130. In order to prevent light from source 132 from creating shadow on the right side of a subject 134, the light from source 132 must be prohibited from passing beyond the right-hand edge of subject 134. In the embodiments presented previously, this was achieved by using baffles or mirrors strategically placed, for example, at points X in FIG. 2, so as to cut off light passing toward this right side of the subject's head. The same procedure described above may be applied to a light source 136 located to the right of lens 130. Source 136 will produce "hidden" shadows at points F, G, H, I and J and visible shadows at points A, B, C, D and E which may be seen by lens 130. Accordingly, light from source 136 must be prevented from passing beyond the left-hand edge of subject 134. As previously noted, this was accomplished in the two embodiments disclosed through the use of mirrors partially employed as baffles (Points X in FIG. 2). While the prevention of light passing beyond a certain point may be easily accomplished through the use of baffles and mirrors, it is necessary that the light intensities from each source complement the other so as to produce even illumination across the subject's face, as previously noted with regard to FIGS. 3, 6, 7 and 8. By employing the various criteria noted above, a portrait photograph exhibiting "shadowless" background may be easily produced with the present illuminating system while retaining natural modeling of the facial features and showing catch lights in the subject's eyes. Additionally, the present lighting system retains the capability of being employed in not only portrait photographing but in the photographing of inanimate subject matter wholly contained within the field of view of the camera's objective lens. In this regard, reference should be made to FIGS. 11–14.

Figure 12:
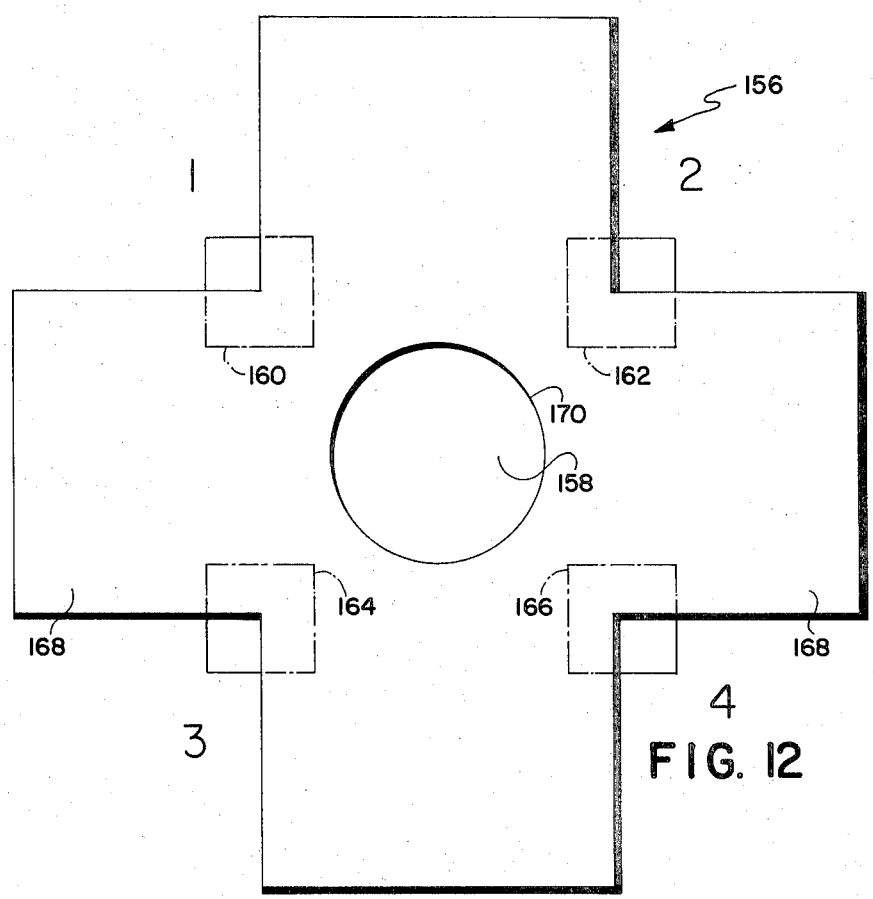
FIG. 12 is a diagrammatic representation of a third embodiment of the lighting system of the present invention.
Figure 13:
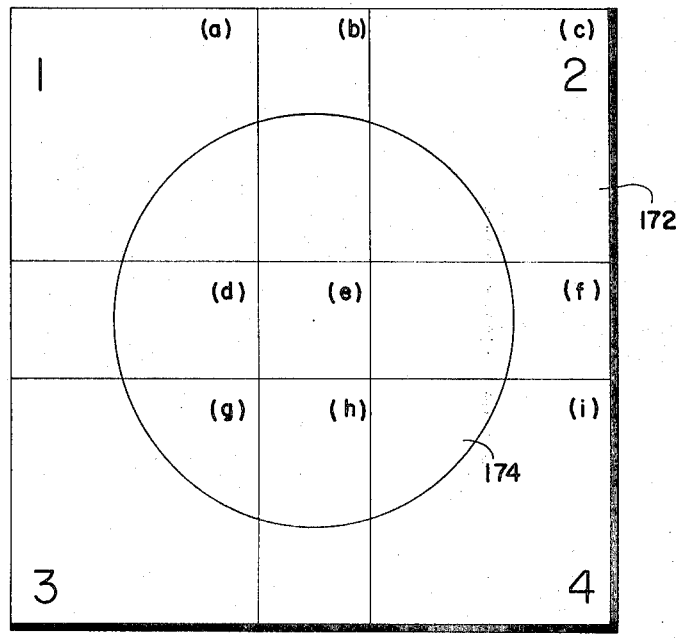
FIG. 13 is a graphic representation of a subject and background associated with the lighting system of FIG. 12.

FIG. 11a represents one relatively obvious manner which might be employed in an attempt to eliminate background shadow behind an object fully contained within the field of view of the objective lens of a camera. A pair of baffles 138 and 140 might be positioned on either side of an objective lens 142 and have a pair of light sources 144 and 146 on their outer sides, respectively. When used to illuminate a subject 150 (see FIG. 11b), the apparatus of FIG. 11a will produce a shadow of object 150 on the background placed behind it. A shadow 152 will be evident at the top of subject 150 and a shadow 154 will be produced along the bottom portion of subject 150. Placing additional baffles and light sources at the top and bottom of lens 142 does little more to alleviate shadow. Specifically, the top and bottom sources produce shadows on the left-hand and right-hand side of subject 150. However, all four shadowed areas produced will not be as dark as if a single light source were used (the umbral shadow having been altered to preumbral type shadows). FIG. 12 discloses a lighting arrangement 156 which is operative to eliminate background shadow successfully in a photograph of an object fully contained within the field of view of an objective lens 158. Positioned radially from objective lens 158 are four equal sized square-shaped light sources 160, 162, 164 and 166. The four light sources are equally spaced from each other by appropriate brackets or the like (not shown) and are radially movable together with respect to lens 158 and baffle 168. Positioned in front of the four light sources is a cross-shaped light baffle 168. Baffle 168 contains a hole 170 having a diameter equal to the diameter of lens 158, the latter passing through the former for viewing purposes. Light sources 160, 162, 164 and 166 are radially moved with respect to lens 158 for varying subject distances. While the four light sources have been shown proximate lens 158, they may be strategically mounted to a copyboard or the like with each having an associated baffle. It should be noted that only one quarter of each light source is shown extending out from baffle 168. This condition exists at only one point of the copyboard toward which lens 158 is directed, i.e., the point in the center which is along the optical axis of lens 158. At all other positions, the amount of light from each light source illuminating the object will be some varying amount from 100 percent to 0 percent with the total sum from all four sources falling on each point equaling 100 percent of a full light source. The specific zones of influence for each light source will be best understood by making reference to FIGS. 13 and 14. FIG. 13 illustrates a background 172 commensurate with the relative field of view of lens 158 broken into nine imaginary portions with an object 174 centered therein. Each of the four light sources has some amount of lighting influence upon one portion of quadrant of background 172. These quadrants overlap and may be best seen by making reference to FIG. 14. The first quadrant 1 is illuminated by light source 160, the second quadrant by light source 162, etcetera. Quadrant 1 is not solely illuminated by light source 160, but contains portions which are also illuminated by sources 162, 164 and 166 to some varying degree. Each of the nine imaginary zones in FIG. 13 is labelled and may be transferred to FIG. 14 for more easy identification. Note in this regard that all zones (except (a), (b), (g), and (i)) are illuminated by more than one of the four sources. Applicant has discovered that any one point on background 172 is so illuminated by one or more of the four sources, that its illumination intensity level will be one. For example, the center point of zone (e) derives one quarter of its illumination from each of the four light sources, as may be seen from FIG. 12 (one quarter of each light source is shown extending beyond light baffle 168). Set into each of the four quadrants of FIG. 14 is a "no shadow" graph denoting the orientation of the body of the object and its edge which satisfies the "no shadow" parameters for that quadrant, as noted in the previous discussion relative to FIGS. 9a, 9b and 10. While these graphs indicate 90° orientation angle limits, they may vary depending upon the lens to light source position as previously noted with respect to FIGS. 9a and 9b. Should the object 174 be fully contained within any one of the four quadrants, there will be a shadow produced on the background 172. For example, a small object 176 fully contained within quadrant 2 of FIG. 14 will produce an associated shadow as shown therein. The areas of shadow not hidden by object 176 itself are those body and edge orientations which do not satisfy the parameters of the "no shadow" angle. No "seeable" shadow will be produced by the light source 162 from point 178 clockwise to point 180 along object 176. While not shown, each of the other three quadrants will produce similar shadows of an object fully contained within that quadrant in much the same manner as noted with respect to quadrant 2. As previously noted, shadows which may be seen by lens 158 will be produced by any edge on an object which does not satisfy the angular and body-to-edge parameters set forth in each individual quadrant. Note, however, that for object 174 centered on background 172 [and covering zone (e) fully], there will be no shadows produced which may be seen by lens 158. This is due to the fact that in each of the four quadrants the body-edge relationship of each portion of object 174 contained within that quadrant has satisfied the body edge parameters disclosed for each of the quadrants. While a relatively circular object 174 has been shown, there are objects which may have irregular edges which do not satisfy the body-edge parameters set forth in the quadrant in which it is positioned. In these relatively rare areas, some shadows will be produced. Note, however, that for the large majority of simply formed and shaped objects, no shadow will be produced which the lens 158 can see, the shadows being fully contained behind object 174 away from the sight of lens 158. Additionally, it should become apparent that the rules disclosed with regard to portrait photography also apply with equal importance in the photography of inanimate objects fully contained within the field of view of lens 158. For example, the transition from one light source to another on the subject must be completed within the subject area of the object. In the present embodiment, this is accomplished by baffle 168. Similarly, the points of discontinuity of the light coming from each light source (those points at which the intensity of the light from any one source undergoes discontinuous changes on the subject) must coincide with the points of discontinuity of the other light sources for even illumination of the subject. Note in this regard the coincidence of the points of discontinuity in FIGS. 3 and 6 and the noncoincidence of the points in FIGS. 7 and 8. Note additionally, that these points of discontinuity are controlled by light baffles, whether they be baffles per se or mirrors which, in part, function as baffles.

As may have been evidenced from the foregoing discussion, there are a total of four variables or parameters which have a direct bearing upon the "shadowless" background operability of the present invention. These variables are the subject distance $D_S$, the subject width $W_S$, the baffle distance from the light source $D_L$ and the light source width $W_L$. In order to alleviate any objectionable background shadowing, the variables must satisfy a formula simply expressed as:

$$\frac{W_S}{D_S} \geq \frac{W_L}{D_L}$$

(where there is a transition in one direction between only two light sources)

This formula is applicable for the embodiments disclosed in FIGS. 5 and 12. The embodiment shown in FIG. 1, however, includes a central light bundle and requires a slight change in the formula which may be expressed as:

$$\frac{W_S}{2D_S} \geq \frac{W_L}{D_L}$$

(because there are two transitions across the subject's face)

Although no definite values for these variables have been given, pragmatic considerations suggest that $W_L$ be minimized so that the required value of $D_L$ can remain small (within practical limits).

The present invention in its preferred embodiments is characterized in providing a portable and inexpensive lighting system for producing aesthetically natural and pleasing lighting for both portrait and object photographs while eliminating objectionable background shadow. The lighting system may employ any one of a variety of light sources and may be most obviously employed in portrait identification photography. However, it should be carefully noted that the present lighting system is readily adaptable to an imaging system from still cameras to television in which background shadowing is aesthetically undesirable. Moreover, and possibly most importantly, the lighting system of the present invention can be effectively utilized by the professional as well as the most inexperienced amateur photographer for use as either a primary or a fill-in lighting system.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Illuminating apparatus adapted to be mounted with a photographic camera for photographing a subject positioned substantially on the optical axis of the photographic camera and located a given distance in front of a background surface, said photographic camera having a field of view greater than the subject, said illuminating apparatus comprising:

lighting means positioned proximate said camera for evenly illuminating the subject to be photographed and the background surface, said lighting means including dividing means for providing at least two separate and distinct apparent sources of light with at least one apparent source of light positioned on one side of the optical axis of the camera for illuminating a portion of the subject and the background surface located substantially on the same side of the optical axis of the camera and at least another apparent source of light positioned on the other side of the optical axis of the camera for illuminating a portion of the subject and background surface located substantially on the same side of the optical axis of the camera as said another apparent source of light, said apparent sources of light having overlapping areas and exclusive areas of lighting influence on said subject; and light baffling means positioned in close proximity with said lighting means between said lighting means and said subject for selectively and precisely limiting the divergence of said at least two separate and distinct apparent sources of light such that said at least one apparent source of light positioned on one side of the optical axis is precluded from illuminating beyond the subject edge on the other side of the optical axis and from passing behind the subject of said one side and illuminating said background surface on said other side of the camera's optical axis and such that said at least another apparent light source on the other side of the optical axis is precluded from illuminating beyond the subject edge on the one side of the optical axis and from passing behind the subject on said other side and illuminating said background surface on said one side of the camera's optical axis, the divergence of said at least two separate and distinct apparent sources of light being so selectively limited as to direct a shadow of the subject caused by said lighting means wholly behind the subject on the background surface, whereby the shadow of the subject is hidden from the field of view of the camera by the subject itself, said shadow of the subject being at least less than the width of the subject.

2. The illuminating apparatus of claim 1 in which said lighting means is a single light source adapted to be mounted on said photographic camera, said dividing means dividing the light from said single light source into at least two separate and distinct apparent sources of light for illuminating said subject.

3. The illuminating apparatus of claim 2 in which said dividing means includes a plurality of mirrors angularly oriented with respect to said light source and with respect to each other so as to divide the light from said single light source into at least two separate and distinct apparent sources of light.

4. The illuminating apparatus of claim 3 in which said plurality of mirrors is configured as four mirrors positioned substantially between said subject and said single light source for dividing said light from said single light source into two separate and distinct apparent sources of light directed so as to illuminate said subject.

5. The illuminating apparatus of claim 4 in which a first two of said mirrors are positioned directly between said single light source and said subject for dividing the light emanating from said single light source and angularly redirecting the light to both sides of the camera's optical axis in a direction away from said subject and away from the camera's optical axis, and another two of said mirrors positioned with respect to said first two of said mirrors for redirecting the light redirected by said first two of said mirrors toward and subject to illuminate select portions of said subject, said another two of said mirrors being positioned substantially laterally from said first two of said mirrors and said single light source one on either side of the optical axis of the camera.

6. The illuminating apparatus of claim 5 in which said light baffling means is formed as edge portions of both of said another two of said mirrors for limiting the angular divergence of each of said two apparent sources of light, said edge portions of said another two of said mirrors being so configured and positioned with respect to said single light source and said first two mirrors as to limit the angular divergence of said two apparent sources of light such that one apparent source of light positioned on a given side of the optical axis of the camera is precluded from illuminating the background beyond the subject edge on the other side of the optical axis.

7. The illuminating apparatus of claim 6 in which said photographic camera is a portrait camera having an objective lens for imaging a subject's head, said single light source having a width $W_L$, the head of said subject having a width $W_S$, said subject being positioned a subject distance $D_S$ from said objective lens and the limiting optical path distance between one apparent source of light and said edge portion on said another two of said mirrors which precisely limits the divergence of an apparent source of light being denoted as a distance $D_L$, said subject head width, said subject distance, said light source width and said distance $D_L$ satisfying a relationship expressed:

$$W_S/D_S \quad W_L/D_L,$$

whereby the shadow of said subject formed by said two apparent sources of light is fully contained behind said subject on said background and is hidden from the field of view of said objective lens by said subject itself.

8. The illuminating apparatus of claim 4 in which said four mirrors and said light baffling means are so configured and positioned with respect to said single light source so as to direct and limit the divergence of each of said two separate and distinct apparent light sources into overlapping areas of light influence on said subject.

9. The illuminating apparatus of claim 8 in which said four mirrors and said light baffling means are so configured and positioned with respect to said single light source so as to direct said overlapping areas of light influence of said two apparent light sources occur only on said subject and not on said background, said light baffling means limiting the divergence of said two apparent light sources such that said background on each side of the optical axis of said camera is illuminated solely by the apparent light sources located on the same side of the optical axis.

10. The illuminating apparatus of claim 9 in which said light baffling means is formed as a limiting physical edge on two of said four mirrors, said light baffling means being configured to selectively limit and direct said separate and distinct apparent light sources into selective areas of overlapping lighting influence and into areas of exclusive lighting influence for each of said light paths, the light intensity of any one of said light paths being at a given maximum within said selective areas of exclusive lighting influence and being less than full within said selective areas of overlapping lighting influence, the light intensity at any point on said subject having a total sum of said given maximum intensity.

11. The illuminating apparatus of claim 3 in which said plurality of mirrors are positioned with respect to each other and said single light source for dividing said light from said single light source into three separate and distinct light paths.

12. The illuminating apparatus of claim 11 in which said plurality of mirrors are configured and positioned with respect to said single light source and each other as to limit and direct each of said three separate and distinct apparent sources of light into overlapping areas of lighting influence on said subject.

13. The illuminating apparatus of claim 12 in which light baffling means is so configured and positioned with respect to said single light source as to direct said overlapping areas of lighting influence such that they occur only on said subject itself and not on said background.

14. The illuminating apparatus of claim 13 in which said plurality of mirrors and said light baffling means selectively limits and directs said three separate and distinct apparent sources of light into selective areas of overlapping lighting influence and into areas of exclusive lighting influence, the light intensity of said apparent sources of light being at a given maximum within their said selective areas of exclusive lighting influence and the light intensity of said three apparent sources of light being less than said given maximum within said selective areas of overlapping lighting influence, the light intensity of said three separate and distinct apparent sources of light totaling said given maximum intensity of any point within said areas of overlapping lighting influence, the light intensity at any point on said subject having a total sum of said given maximum light intensity, whereby said subject is evenly illuminated.

15. The illuminating apparatus of claim 11 in which said plurality of mirrors is configured as four mirrors positioned substantially between said subject and said single light source for dividing said light from said single light source into three separate and distinct apparent sources of light directed so as to illuminate said subject.

16. The illuminating apparatus of claim 15 in which a first two of said mirrors are positioned directly between said single light source and said subject for dividing the light from said single light source and angularly redirecting the light to both sides of the camera's optical axis in a direction away from said subject and away from the camera's optical axis, said first two of said mirrors being separated a given distance for providing a gap between which light from said single light source may pass to directly illuminate said subject, and another two of said mirrors positioned with respect to said first two of said mirrors for redirecting the light redirected by said first two of said mirrors toward said subject to illuminate select portions of said subject, said another two of said mirrors being positioned substantially laterally from said first two of said mirrors and said single light source one on either side of the optical axis of such camera.

17. The illuminating apparatus of claim 16 in which said light baffling means is formed as the inner edge portions of said first two of said mirrors which form said gap, said edge portions of said first two of said mirrors limiting the angular divergence of each of said two apparent sources of light on either side of the optical axis of the camera, said edge portions of said first two of said mirrors being so positioned and configured with respect to said single light source and said another two of said mirrors as to limit the angular divergence of said two apparent sources of light such that one apparent source of light positioned on a given side of the optical axis of the camera is precluded from illuminating the background beyond the subject edge on the other side of the optical axis.

18. The illuminating apparatus of claim 17 in which said photographic camera is a portrait camera having an objective lens for imaging a subject's head, said single light source having a width $W_L$, the head of said subject having a width $W_S$, said subject being positioned a subject distance $D_S$ from said objective lens and said first two of mirrors forming said gap having said gap forming edge portions positioned a distance $D_L$ from said single light source, said subject head width, said subject distance, said distance $D_L$ and said light source width satisfying the relationship $$W_S/2D_S \quad W_L/D_L$$

whereby said subject is evenly illuminated and the shadow of said subject is fully contained behind said subject on said background and is hidden from the field of view of said objective lens by said subject itself.

19. The illuminating apparatus of claim 1 in which said lighting means is four light sources adapted to be mounted upon a photographic camera including an objective lens for imaging a subject to be photographed, said subject being wholly contained within the field of view of said objective lens and which is positioned in front of a background.

20. The illuminating apparatus of claim 19 in which said light baffling means is configured as an opaque light baffle, said opaque light baffle being in light limiting and light directing proximity with each of said four light sources.

21. The illuminating apparatus of claim 20 in which said four light sources are radially spaced from said objective lens and are selectively movable into and out of covered relationship with said opaque light baffle, said four light sources being equally spaced from said objective lens and equally spaced from each other.

22. The illuminating apparatus of claim 21 in which each of said four light sources has a width $W_L$, said subject having a width $W_S$, said subject being positioned a subject distance $D_S$ from said objective lens and said baffle being positioned a distance $D_L$ from each one of said four light sources, said light source width, said subject width, said subject distance and the baffle distance $D_L$ satisfying the relationship $$W_S/D_S \quad W_L/D_L$$

whereby said subject is evenly illuminated and the shadow of said subject is fully contained behind said subject on said background and is hidden from the field of view of said objective lens by said subject itself when said subject is positioned with its center substantially along the optical axis of said objective lens.

23. The illuminating apparatus of claim 21 in which said opaque light baffle limits and directs each of the four light sources into overlapping areas of lighting influence.

24. The illuminating apparatus of claim 23 in which said opaque light baffle selectively directs said four separate and distinct light sources into selective areas of overlapping lighting influence and into areas of exclusive lighting influence, the light intensity from any one of said four light sources on said subject being at a given maximum intensity within said areas of exclusive lighting influence and being less than said given maximum intensity within said areas of overlapping lighting influence, the light intensity at any point on said subject having a total sum of said given maximum intensity for evenly illuminating said subject, the light intensity from all four of said separate and distinct light sources totalling said given maximum intensity at any point within said areas of overlapping lighting influence.

25. The illuminating apparatus of claim 24 in which said opaque light baffle is configured and positioned with respect to each of said four sources of light such that said areas of overlapping lighting influence include areas in which two of said separate and distinct light sources have overlapping lighting influence and areas in which all four of said light sources have overlapping lighting influence, said four sources of light and said opaque light baffle being so directed and positioned with respect to each other such that said subject to be photographed is positioned in said field of view of said objective lens and said area in which all four of said light sources have overlapping lighting influence is fully contained within the area of said subject, whereby the shadow of said subject is wholly contained behind said subject on said background and is hidden from said field of view of said objective lens by the area of said subject itself when said subject is wholly contained within the field of view of said objective lens.

26. The illuminating apparatus of claim 1 in which said light baffling means limits the divergence of said at least two separate and distinct apparent sources of light such that said exclusive areas of lighting influence on said subject have a first given light intensity from one of said apparent sources of light and said overlapping areas of lighting influence on said subject have a second given light intensity from at least two of said apparent sources of light, said light baffling means limiting the divergence of said apparent sources of light such that said first given light intensity and said second given light intensity are equal and said subject is evenly illuminated by said lighting means.

27. The illuminating apparatus of claim 1 in which said light baffling means is so configured and positioned with respect to said lighting means such that any one of said at least two apparent sources of light is prohibited from illuminating the background on the side opposite the optical axis from which it emanates and on which it is positioned when the apparent source of light is positioned on one side of the optical axis of the camera, and any more than the subject itself when the apparent source of light is positioned on the optical axis of the camera.

28. The illuminating apparatus of claim 27 in which said light baffling means is so configured and positioned with respect to said lighting means such that the light intensity from one of said apparent sources of light is greater in its area of exclusive influence than the light intensity from the same one of said apparent sources of light in its area of overlapping influence with another of said apparent sources of light, said light baffling means being so configured such that the totality of light intensity in said areas of overlapping influence is equal to the light intensity in said areas of overlapping lighting influence.

29. The illuminating apparatus of claim 28 in which said light baffling means is so configured and positioned with respect to said lighting means as to produce areas of light intensity transition for every one of said at least two apparent sources of light, said areas of light intensity transition including the area in which the light intensity of a given apparent source of light at the subject gradually changes from a given maximum intensity to a zero intensity, said light baffling means directing and limiting the divergence of said lighting means such that said transition areas for each of said apparent sources of light fall totally within the area of the subject itself.

* * * * *